United States Patent [19]

Nakajima et al.

[11] Patent Number: 4,468,676

[45] Date of Patent: Aug. 28, 1984

[54] TRANSFER TYPE HEAT-SENSITIVE PRINTER

[75] Inventors: Hisao Nakajima; Yoshiki Kikuchi; Takashi Ohmori, all of Kanagawa, Japan

[73] Assignee: Fuji Xerox Co., Ltd., Tokyo, Japan

[21] Appl. No.: 396,544

[22] Filed: Jul. 9, 1982

[30] Foreign Application Priority Data

Jul. 17, 1981 [JP] Japan ................................ 56-110770

[51] Int. Cl.³ ........................ G01D 15/24; B65H 7/00

[52] U.S. Cl. ............................... 346/76 PH; 346/138; 271/266

[58] Field of Search .................. 346/76 PH, 134, 138; 400/120; 271/265, 260

[56] References Cited

U.S. PATENT DOCUMENTS

| | | | |
|---|---|---|---|
| 3,227,344 | 1/1966 | Rutter | 271/266 |
| 3,813,163 | 5/1974 | Kobayashi | 271/269 X |
| 4,425,568 | 1/1984 | Moriguchi et al. | 346/76 PH |

*Primary Examiner*—E. A. Goldberg
*Assistant Examiner*—Todd E. DeBoer
*Attorney, Agent, or Firm*—Sughrue, Mion, Zinn, Macpeak, and Seas

[57] ABSTRACT

A heat-sensitive printer is provided with an apparatus for effecting the stoppage of a travelling ink donor sheet as soon as a recording sheet can be separated therefrom of the printing, in order to economize the consumption of the donor sheet.

6 Claims, 4 Drawing Figures

FIG. 2
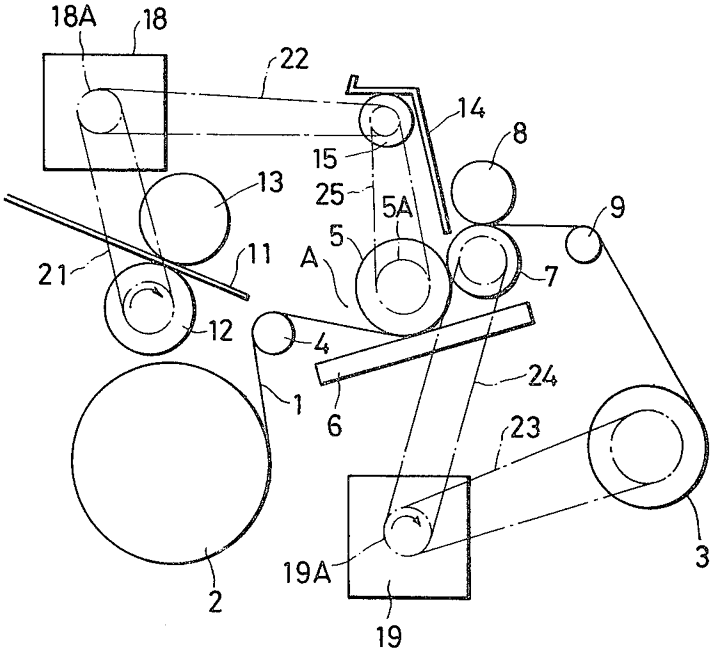
FIG. 4(a)
FIG. 4(b)
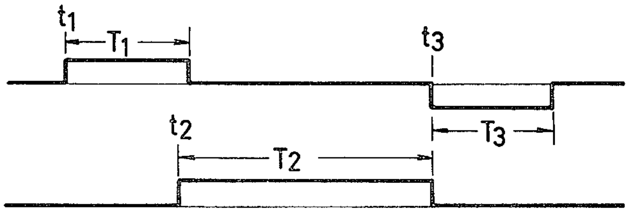

TRANSFER TYPE HEAT-SENSITIVE PRINTER

FIELD OF THE INVENTION

This invention relates to a transfer type heat-sensitive printer. More particularly, it relates to a printer in which an ink donor sheet is used to record data through thermal transfer on a recording sheet which is supplied to the recording section independently of the ink donor sheet.

BACKGROUND OF THE INVENTION

In recording data with a transfer type heat-sensitive printer, an ink donor sheet on which thermally sublimable or thermally meltable solid ink has been coated is laid over a recording sheet (which is an ordinary sheet). When the donor sheet and recording sheet are arranged in this manner the thermal pulses are applied thereto from the side of the ink donor sheet. This causes the sublimated or molten ink to be transferred onto the recording sheet.

FIG. 1 shows a conventional transfer type heat-sensitive printer having conveying systems which supply an ink donor sheet and a recording sheet separately to the recording section. The printer has a supply donor roll 2 for supplying the ink donor sheet 1 and a take-up donor roll 3 for winding the ink donor sheet 1. The ink donor sheet 1 from the supply donor roll 2, being guided by an idler shaft 4, passes between a back roll 5 and a thermal head 6. The sheet 1 further passes between the back roll 5 and a drive roll 7 and between the drive roll 7 and a pinch roll 8. The sheet 1 thus run, being guided by another idler shaft 9, is wound on the take-up donor roll 3.

On the other hand, the recording sheet 11 which has been cut to a predetermined size is fed with predetermined timing by a pair of feed rollers 12 and 13. The recording sheet 11 is combined with the ink donor sheet 1 upstream of the recording section A which is made up of the back roll 5 and the thermal head 6. The recording sheet 11 thus combined passes over the heat generating elements of the thermal head 6, while being held between the ink donor sheet 1 and the back roll 5. In this operation, thermal transfer recording is carried out. Hereafter, the recording sheet 11 passes between the back roll 5 and the drive roll 7. During this operation, the recording sheet 11 is run in the common tangential direction of the rolls 5 and 7 by its own elastic strength, to separate from the ink donor sheet 1. Then, the recording sheet 1, being guided by a guide plate 14 disposed above the drive roll 7, is delivered to a discharging roll 15 which is located near a recording sheet discharging outlet (not shown). After being caught by the discharging roll 15, the recording sheet 11 is delevered to a discharging tray (not shown).

The conveying systems for the ink donor sheet 1 and the recording sheet 11 have two drive sources, respectively. The first drive source 16 drives the feed roll 12, to feed the recording sheet 11 simultaneously when the recording operation starts. On the other hand, when the top end of the recording sheet 11 comes near the recording section A, the second drive source 17 turns the take-up donor roll 3 and the drive roll 7 in the directions of the arrows through belts. The rotation of the drive roll 7 is transmitted to the back roll 5 which is in contact with the drive roll 7, and the rotation of the back roll 5 is transmitted to the discharging roll 15 through a belt. Thus, the ink donor sheet 1, and the recording sheet which has reached the recording section A are conveyed and discharged. When the recording sheet has been discharged, the second dirve source 17 is stopped.

As is apparent from the above description, in the conventional transfer type heat-sensitive printer, is is necessary to operate the second drive source until the recording sheet is completely delivered to the discharging tray by the discharging roll 15. Accordingly, for a while after the rear edge of the recording sheet has passed through the back roll 5 and the drive roll 7, the ink donor sheet 11 is run; that is, the ink donor sheet is uselessly consumed.

SUMMARY OF THE INVENTION

In view of the foregoing, an object of this invention is to provide a transfer type heat-sensitive printer in which, after an ink donor sheet and a recording sheet have been separated from each after a recording operation, the movement of the ink donor sheet is stopped, and only the recording sheet is moved.

The foregoing object of the invention has been achieved by providing a transfer type heat-sensitive printer in which, according to the invention, the drive shaft of a first drive source is turnable in two directions. When the drive shaft is turned in one direction a feed roll is turned through a one-way clutch adapted to transmit the torque. When the drive shaft is turned in the other direction a discharging roll is turned through another one-way clutch adapted to transmit the torque. Accordingly, the recording sheet is conveyed after the operation of a second drive source adapted to convey an ink donor sheet has been stopped.

BRIEF DESCRIPTION OF THE DRAWINGS

FIG. 2 is a cross-sectional perspective view of the printer of this invention;

FIG. 4 is a timing chart relating to the description of the operation of the first and second drive motors.

DETAILED DESCRIPTION OF THE INVENTION

This invention will be described with reference to its preferred embodiment. However, the invention is not limited to this particular embodiment.

Figure 1:
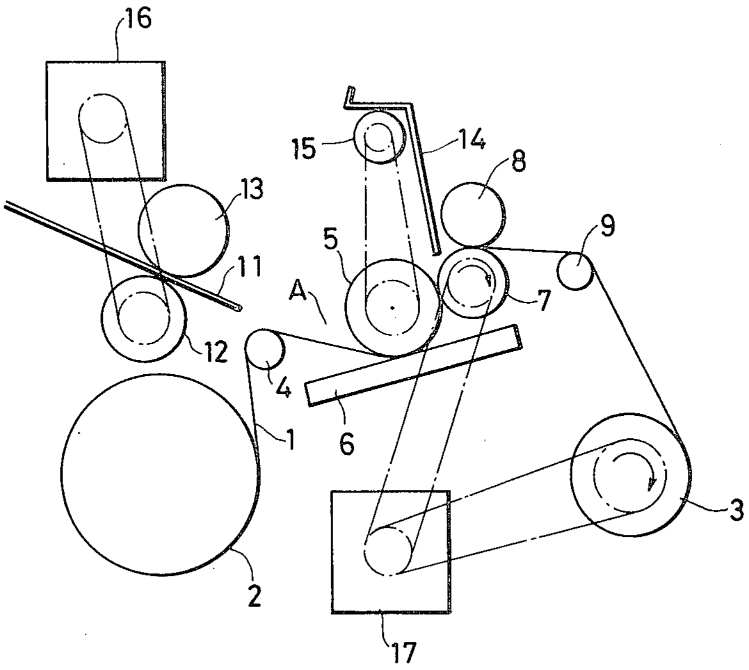
FIG. 1 PRIOR ART
FIG. 1 is a cross-sectional, perspective view of a conventional transfer type heat-sensitive printer.

FIG. 2 outlines a transfer type heat-sensitive printer according to the embodiment of the invention. In FIG. 2, those components which have been previously described with reference to FIG. 1 are therefore designated by the same reference numerals or characters. In the printer, the conveying systems for the ink donor sheet 1 and the recording sheet 11 are provided with two drive motors (or drive sources) 18 and 19, respectively. The first drive motor 18 drives the feed roller 12 through a first belt 21 and the discharging roll 15 through a second belt 22. The second drive motor drives the take-up donor roll 3 through a third belt 23 and the drive roll 7 through a fourth belt 24. A fifth belt is laid over the back roll 5 and the discharging roll 15, so that the latter 15 is driven by the back roll 5.

Figure 3:
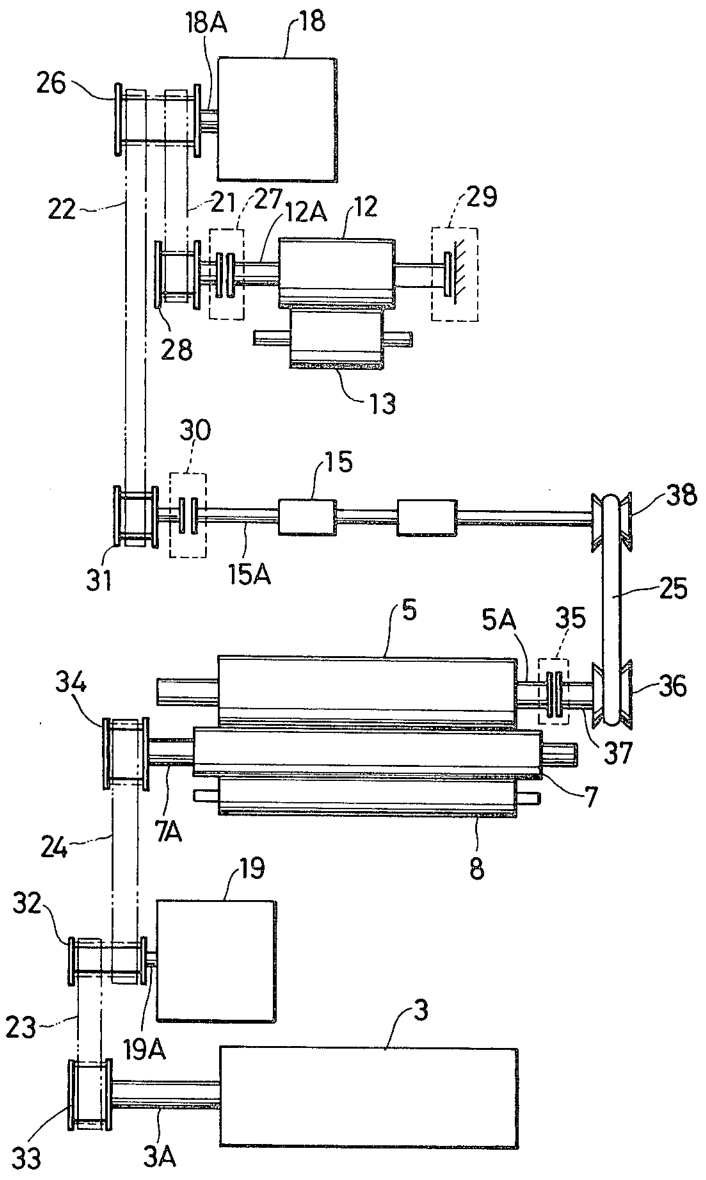
FIG. 3 is an overhead perspective view of the printer of this invention.

The drive system for the ink donor sheet and the recording sheet in the printer is as shown in FIG. 3. A first motor pulley 26 is mounted on the motor shaft (or the drive shaft) of the first drive motor 18, and the first and second belts 21 and 22 are laid on the first motor pulley 26. The other end of the first belt 21 is laid over a first belt pulley 28 which is coupled through a first one-way clutch 27 to the rotary shaft 12A of the feed roll 12. The first one-way clutch 27 operates to transmit power to the rotary shaft 12A of the feed roll only when the motor shaft 18A of the first drive motor turns clockwise in FIG. 2. A frictional brake 29 is provided on the opposite end of the rotary shaft 12A, to prevent unwated rotation of the feed roll 12 due to vibration or the like of the printer. The other end of the second belt 22 is laid over a second belt pulley 31 which is coupled through a second one-way clutch 30 to the rotary shaft 15A of the discharging roll 15. The second one-way clutch 30 operates to transmit power to the rotary shaft 15A of the discharging roll only when the motor shaft 18A of the first drive motor turns counterclockwise in FIG. 2.

On the other hand, a second motor pulley 32 is mounted on the motor shaft 19A of the second drive motor 19, and the third and fourth belts 23 and 24 are laid over the second motor pulley 32. The other end of the third belt 23 is laid over a third belt pulley 33 which is mounted on the rotary shaft 3A of the take-up donor roll 3. The other end of the fourth belt 24 is laid over a fourth belt pulley 34 which is mounted on the rotary shaft 7A of the drive roll 7. The rotary shaft 5A of the back roll 5, which is not turned by the drive roll 7, is coupled through a third one-way clutch 35 to a rotary shaft 37 on which a fifth pulley 36 is mounted. A fifth belt 25 is laid over the fifth pulley 36 and a sixith pulley 38 which is mounted on one end portion of the rotary shaft 15A of the discharging roll. The third one-way clutch 35 operates to transmit power to the rotary shaft 37 only when the rotary shaft 5A of the back roll turns counterclockwise in FIG. 2.

When a start button (not shown) on the printer is depressed by the operator, the output shaft 18A of the first drive motor is turned clockwise for a predetermined period of time $T_1$ beginning at the time instant $t_1$ as shown in part (a) of FIG. 4, whereby the drive power is transmitted through the first one-way clutch 27 to the feed roll 12 to start feeding the recording sheet 11. A photo-sensor (not shown) detects when the recording sheet comes near the recording section A. At this time instant, a control circuit (not shown) energizes the second drive motor 19. As shown in part (b) of FIG. 4, the output shaft 19A of the second drive motor starts rotating clockwise (in FIG. 2) at this time instant $t_2$, whereby the drive roll 7 starts conveying the ink donor sheet 1, while the ink donor sheet 1 is wound on the donor roll 3. As the drive roll 7 is turned, the back roll 5 is turned by the sheet 1. The back roll 5 operates to press the recording sheet 11 through the ink donor sheet 1 against the recording elements of the thermal head 6 while reducing the running resistance of the ink donor sheet 1. As the back roll 5 is turned, the fifth belt 25 is driven to turn the discharging roll 15.

When the ink donor sheet 1 is started as described above, the front end of the recording sheet 11 is sent to thermal head 6 by being led by the ink donor sheet 1 and the back roll 5. The above-described control circuit has a timer mechanism. This allows for the transmission of the image signal at that instant which is slightly later than the time instant $t_2$. When the thermal head 6 receives the image signal, thermal pulses are applied to the ink donor sheet 1 by the recording elements of the thermal head 6, whereby sublimated or molten ink is transferred to the recording sheet 11. Thus, the thermal-transfer type recording operation is carried out.

When the recording operation has been advanced; i.e. when the front end of the recording sheet 11 has moved a predetermined distance after being peeled off the ink donor sheet 1, the recording sheet 11 is received by the discharging roll 15. Thus, discharging of the recording sheet 11 is started.

When the rear end of the recording sheet 11 passes through the back roll 5 and the drive roll 7 after completion of the thermal-transfer type recording operation, the control circuit stops the operation of the second drive motor 19 in a period of time $T_2$ from the time instant $t_2$, i.e., at the time instant $t_3$ (part (a) of FIG. 4). Furthermore, the control circuit operates to turn the motor shaft 18A of the first drive motor counterclockwise for a period of time $T_3$ from the time instant $t_3$ (part (a) of FIG. 4). Thereby, movement of the ink donor sheet 1 is stopped. The recording sheet 11 is then delivered to the discharging tray by the discharging roll 15. The period of time $T_3$ is selected to be long enough to discharge the recording sheet 11.

As is apparent from the above description, according to the invention, it is unnecessary to convey the ink donor sheet in order to discharge the recording sheet. That is, the ink donor sheet can be efficiently used. Accordingly, the ink donor sheet lasts longer, which facilitates the maintenance of the printer.

In the above-described embodiment, it is possible to prevent the creation of an unused portion of the ink donor sheet after the recording sheet has been separated from the ink donor sheet after the recording operation. However, the creation of such a portion in the ink donor sheet during the time interval which elapses from the time instant that the rear end of the recording sheet leaves the recording elements of the thermal head until it passes through the back roll and the drive roll, can be prevented more effectively by employing the following method: The thermal head is set apart from the back roll so that the ink donor sheet is temporarily separated from the recording sheet. Under this condition, the back roll is driven by its own drive source to convey the recording sheet, while conveyance of the ink donor sheet is temporarily stopped.

Employment of a technique similar to that described above makes it possible to prevent the creation of an unused portion in the ink donor sheet even when a plurality of lines to be printed exist in combination, thus improving the efficient use of the ink donor sheet.

This invention has been disclosed and described herein in what is considered to be the preferred embodiments. However it is to be understood that modifications will be apparent to those skilled in the art upon reading this disclosure.

What is claimed is:

1. A transfer type heat-sensitive printer, comprising;

a recording section for recording data on a recording sheet by thermal transfer;

separating means for separating said recording sheet from an ink donor sheet after data have been recorded on said recording sheet;

a first drive source for selectively turning a drive shaft thereof in two directions;

first clutch means for transmitting, when said drive shaft turns in one direction, power to a drive system which operates to feed said recording sheet to said recording section;

second clutch means for transmitting, when said drive shaft turns in the opposite direction, power to a discharging roll adapted to discharge a recording sheet which has been separated by said separating means; and second drive source for successively supplying an elongated ink donor sheet to said recording section and for halting the supply of said sheet when the rear end of said recording sheet is separated from said ink donor sheet.

2. A printer as claimed in claim 1, wherein said ink donor sheet and said recording sheet are laid upon one another in said recording section, and are separated following said recording section.

3. A printer as claimed in claim 1, said second drive source further driving take up means for said ink donor sheet.

4. A printer as claimed in claim 1, said second drive source driving a drive roll for advancing said ink donor sheet, and a back roll being driven by said ink donor sheet.

5. A printer as claimed in claim 4, said back roll being drivably connected to said discharging roll so that said discharging roll is driven with said back roll.

6. A printer as claimed in claim 5, further including further clutch means between said back roll and said discharging roll so that said back roll is not driven when said discharge roll is driven through said second clutch means, said second clutch means and said further clutch means comprising one way clutches.

* * * * *